United States Patent [19]
Ohsone et al.

[11] Patent Number: 5,861,942
[45] Date of Patent: Jan. 19, 1999

[54] PHOTOGRAPHIC PRINT PROCESSING APPARATUS

[75] Inventors: Yutaka Ohsone; Shunsuke Shibusawa, both of Hino, Japan

[73] Assignee: Konica Corporation, Tokyo, Japan

[21] Appl. No.: 872,692

[22] Filed: Jun. 11, 1997

[30] Foreign Application Priority Data

Jun. 18, 1996 [JP] Japan .................................. 8-177411

[51] Int. Cl.⁶ ............................ G03B 27/32; G03B 27/52
[52] U.S. Cl. ............................... 355/27; 355/40; 355/41; 355/54
[58] Field of Search ................................ 355/27, 28, 40, 355/41, 20, 54; 358/302, 401, 506; 396/612, 617, 620, 622

[56] References Cited

U.S. PATENT DOCUMENTS

| | | | |
|---|---|---|---|
| 5,430,523 | 7/1995 | Tanibata | 355/27 |
| 5,563,984 | 10/1996 | Tanibata | 355/40 |
| 5,633,725 | 5/1997 | Nishida et al. | 358/302 |
| 5,652,661 | 7/1997 | Gallipeau et al. | 358/302 |
| 5,680,199 | 10/1997 | Ishikawa et al. | 355/40 |

*Primary Examiner*—A. A. Mathews
*Attorney, Agent, or Firm*—Frishauf, Holtz, Goodman, Langer & Chick

[57] ABSTRACT

A photographic print processing apparatus, comprises (a) a first exposing section to expose an image of a photographic film onto an unexposed photographic paper; (b) a development processing section to develop the exposed photographic paper; (c) a first conveying passage to convey the exposed photographic paper from the first exposing section to the development processing section; (d) a second conveying passage branched from the first conveying passage and joined with the first conveying passage; (e) a second exposing section, provided on the second conveying passage, to expose an image onto a photographic paper; and (f) a control section to control the first passage and the second passage so as to convey the photographic paper.

12 Claims, 4 Drawing Sheets

PHOTOGRAPHIC PRINT PROCESSING APPARATUS

BACKGROUND OF THE INVENTION

The present invention relates to a photographic print processing apparatus equipped with a first exposing system and a second exposing system.

In a photographic print processing apparatus, for example, an image on a developed photographic film is printed on a photographic paper and the photographic paper is conveyed to a processing section so as to be subjected to a development process, whereby a photographic print is obtained.

In one case, images of all frames of the developed photographic film are printed on a single sheet of photographic paper and an index print is obtained by developing the single sheet of photographic paper.

When both a normal photographic print and an index print are obtained, an exposing system for the normal photographic print and another exposing system for the index print are arranged along the same conveying system. If there is a large difference between processing times of two exposing systems, the faster exposing system such as the exposing process for the normal photographic print is affected by the slower exposing system such as the exposing process for the index print so that the processing capability is lowered.

In another case, for example, the normal photographic print is obtained by conducting printing exposure on a photographic paper, and the index print is obtained by outputting images on an ordinary paper by another print unit such as a thermal printer. In this case, since the normal photographic print and the index print are obtained by different separated systems, even if there is a large difference between processing times for the normal photographic print and the index print, it may be easy to avoid the influence caused by the difference. However, outputted recording mediums become different for the normal photographic print and the index print, such as a photographic paper and a ordinary paper.

SUMMARY OF THE INVENTION

An objective of the present invention to solve the above problems, that is, to provide a photographic print processing apparatus equipped with a first exposing system and a second exposing system and capable of obtaining a print by using a photographic paper without reducing processing capability.

The above objective is attained by the following items according to the present invention.

Item 1. A photographic print processing apparatus is characterized by comprising
- a first exposing system to print image of frames of a developed photographic film onto a photographic paper;
- a first conveying system to convey the photographic paper to a processing section;
- a second conveying system located at a previous stage of the processing section, branched off from the first conveying system and jointed with the first conveying system; and
- a second exposing system located on the second conveying system.

Since a photographic paper can be branched off from the first conveying system to the second conveying system, be exposed by the second exposing system, and then jointed with the first conveying system, an exposing and printing process by the first exposing system can be conducted without being affected by an exposing and printing process by the second exposing system, whereby the processing capability is increased.

Item 2. The photographic print processing apparatus described in Item 1, is characterized in that the second conveying system is located between the first exposing system and the processing section.

Since the second conveying system is located between the first exposing system and the processing section, a photographic paper exposed by the second exposing system can be conveyed to the processing section rapidly so that the processing time can be shortened.

Item 3. The photographic print processing apparatus described in Item 1 is characterized in that the second exposing system prints images of frames of the developed photographic film of an order together.

The printing to obtain index print can be conducted by the second exposing system.

Item 4. The photographic print processing apparatus described in Item 1 is characterized in that the second conveying system has a length allowing at least a single sheet of a photographic paper to be printed by the second exposing system to stay in the second conveying system. At least a single sheet of a photographic paper can surely stay in the second conveying system, then the photographic paper is printed by the second exposing system, thereafter, the photographic paper is jointed into the first conveying system.

Item 5. The photographic print processing apparatus described in Item 1 is characterized in that the photographic paper to be printed by the second exposing system is conveyed before the printing by the first exposing system is started. By conveying the photographic paper to be printed by the second exposing system in advance, the printing process by the second exposing system can be started without depending on the printing process by the first exposing system.

Item 6. The photographic print processing apparatus described in Item 1 is characterized in that the printing by the second exposing system is conducted by detecting the completion of the prejudgment conducted before the printing by the first exposing system, and the photographic paper printed by the second exposing system is conveyed by the second conveying system to the processing section after the photographic paper on which a final image is printed by the first exposing system is conveyed to the processing section. Since the printing is conducted by the second exposing system by detecting the completion of the prejudgment conducted in the time of the printing by the first exposing system and the photographic paper printed by the second exposing system is conveyed to the processing section after the photographic paper on which a final image is printed by the first exposing system is conveyed to the processing section, for example, index print is obtained after normal photographic print.

DETAILED DESCRIPTION OF THE PREFERRED EMBODIMENTS

Figure 1:
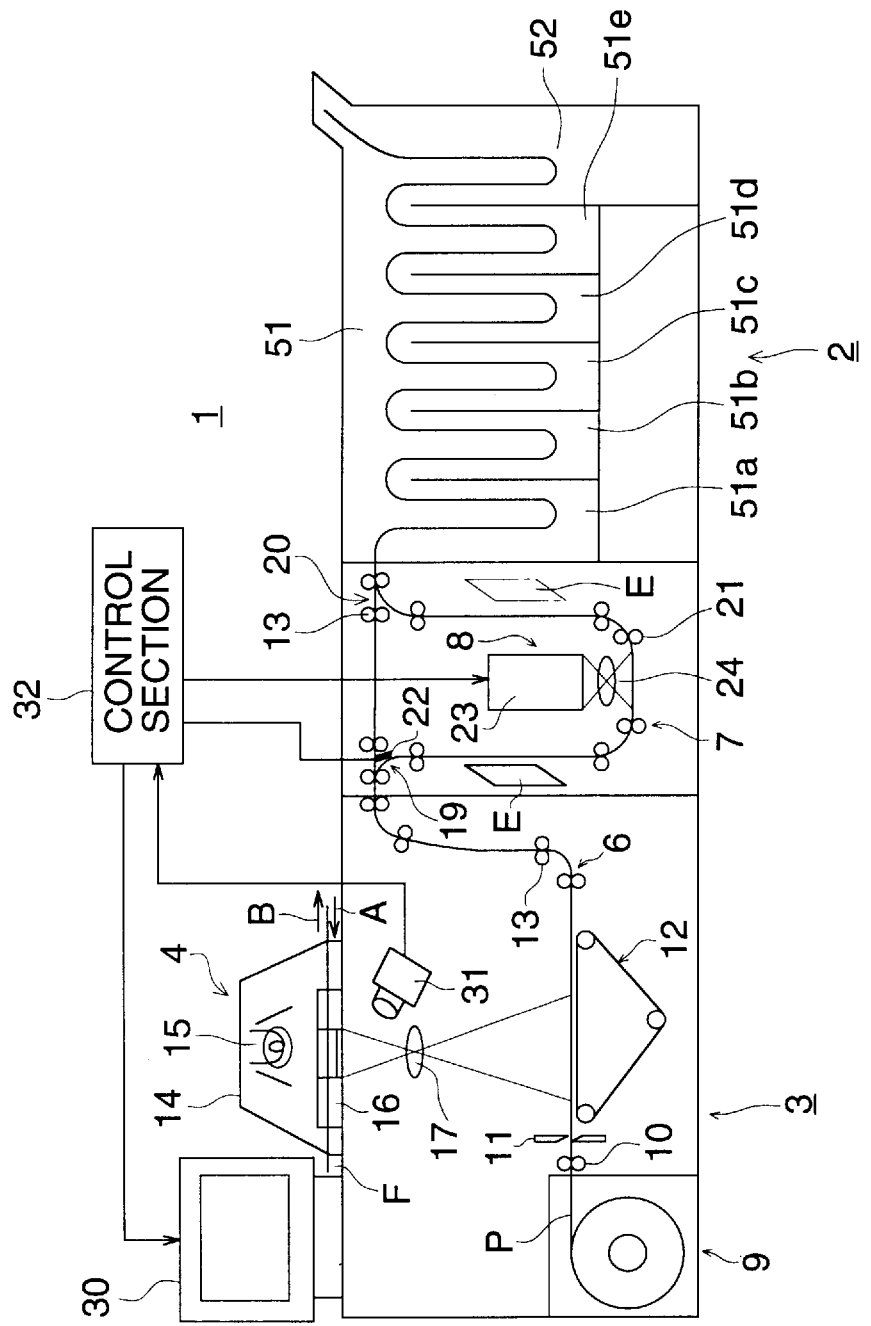
FIG. 1 is a sectional view showing an outlined structure of a printer processor in which a photosensitive material processing apparatus and a photographic print processing apparatus are integrally constructed.
Figure 2:
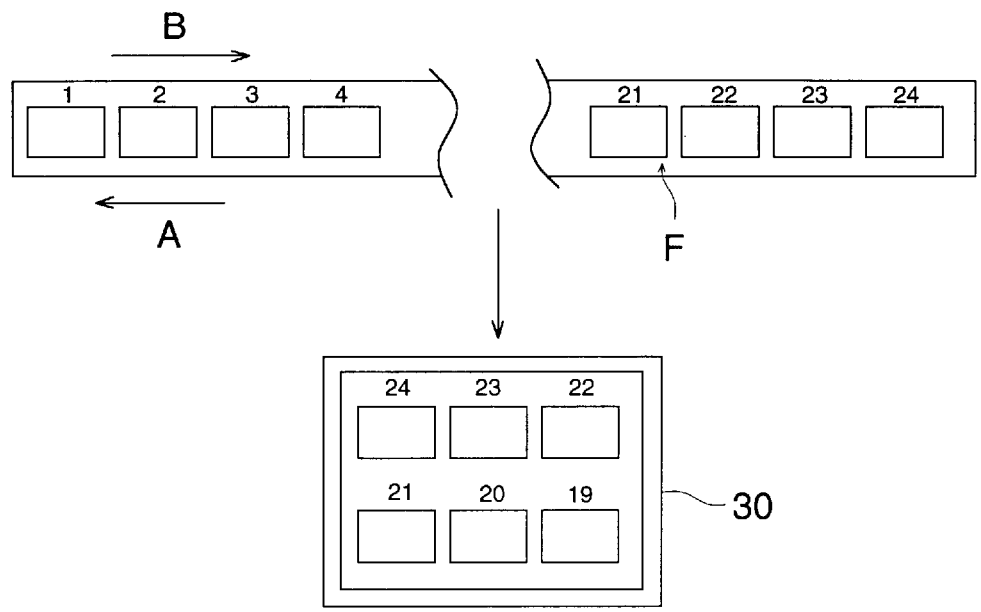
FIG. 2 is a view showing processing in the first exposing section.
Figure 3:
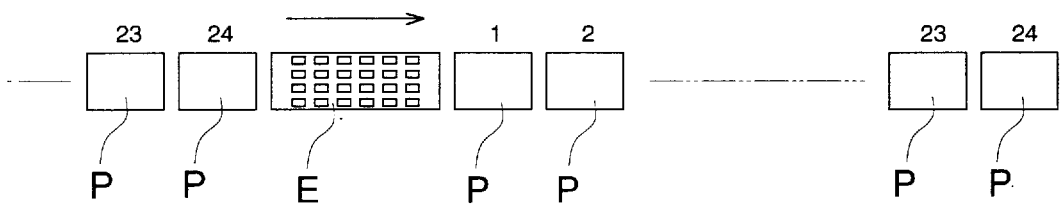
FIG. 3 is a view showing a conveying order.

Hereinafter, an embodiment of the present invention will be explained referring to drawings. FIG. 1 is a schematic drawings of a printer processor in which a light-sensitive material processing machine and a photographic printer are integral. FIG. 2 is a drawing showing processing in the first exposure section. FIG. 3 is a drawing showing conveyance procedure.

At the right side of printer processor 1, light-sensitive material processing machine 2 is located. At the left side of printer processor 1, photographic printer 3 is located. Light-sensitive material processing machine 2 and photographic printer 3 are integral. Aforesaid photographic printer 3 is composed of first exposing system 4 which prints an image of developed photographic film F on photographic paper P, first conveying system 6 which conveys aforesaid photographic paper P to processing section 51 in light-sensitive material processing machine 2, second conveying system 7 which branches from first conveying system 6 and re-joins thereto located between first exposing system 4 and processing section 51 and second exposing system 8 located in second conveying system 7. In this embodiment, second conveying system 7 is located between exposure system 4 and processing section 51 so that a photographic paper printed in second exposing system 7 can rapidly be sent to the processing section. Therefore, processing time can be shortened. The location of the second conveying system can be limited to as above. It may be located in front of processing section 51.

In addition, at the lower left portion of photographic printer 3, magazine 9 which houses photographic paper P, unexposed silver halide photographic light-sensitive material, in a roll form was set. Photographic paper P fed from aforesaid magazine 9 is fed out by means of feeding roller 10. The photographic paper P is cut to a prescribed size by cutter unit 11 to form a sheet type photographic paper P. Aforesaid sheet type photographic paper P is conveyed by means of belt conveyance means 12.

First conveying system 6 is composed of feeding roller 10, belt conveyer means 12 and conveyance roller 13. Aforesaid first conveying system 6 arranges the roll type photographic paper to a sheet type photographic paper P, and conveys it to processing section 51.

Light-sensitive material processing apparatus 2 is composed of processing section 51 and drying section 52. The sheet type photographic paper is successively conveyed in color developing tank 51a, bleach and fixing tank 51b and stabilizing tanks 51c, 51d and 51e placed in processing section 51 to be respectively subjected to color developing, bleach and fixing and stabilizing. The sheet type photographic paper subjected to respective processing in aforesaid processing section 51 is dried in drier section 52 and discharged outside light-sensitive material processing apparatus 2.

First exposing system 4 is provided with light-source 15 in exposure housing 14. A negative image of developed photographic film F set on negative carrier 16 is exposed on a sheet type photographic paper P. Exposed sheet type photographic paper P is conveyed by means of plural paired conveyance rollers 13, and aforesaid paper is introduced in processing section 5 in light-sensitive material processing apparatus 2.

Photographic printer 3 is provided with monitor 30, scanner camera 31 and control section 32. As shown in FIGS. 1 and 2, scanner camera 31 successively reads images on frames in first exposing system 4 when conveying developed photographic film F in an arrowed direction A. Aforesaid scanner camera 31 displays images on aforesaid read frame on monitor 30 by means of control section 32 for color correction and density correction. Displaying by means of the monitor displays every 6 frames of images on developed photographic film F. Color correction and density correction operation of images outputted on aforesaid monitor 30 is generally referred to as "pre-judge operation". Printing operation is started successively from a frame after aforesaid operation is finished.

Namely, images of frames are successively read due to conveyance of developed photographic film F in an arrowed direction. When reading of images of all frames is finished, the above-mentioned monitor display is conducted. When pre-judging operation by an operator is conducted, the photographic paper P is conveyed to an arrowed direction so that, as shown in FIG. 3, for example, an image of 24th frame is printed on photographic paper P. A normal photographic print is produced by developing the photographic paper P by the photosensitive material processing apparatus 2.

The second conveying system 7 comprises a branch section 19 and a joint section 20 and conveying rollers 21 are arranged between the branch section 19 and the joint section 20. Further, on the branch section 19 is provided a changing means (distributing means) 22 for distributing the photographic paper E to the second conveying system 7. The changing means 22 is controlled by the control section 32 so that the photographic paper E is conveyed from the first conveying system 6 to the second conveying system 7 with a predetermined timing.

At a position of the second exposing system 8, at a position before the second exposing system 8, at a position after the second exposing system 8, or at positions before and after the second exposing system 8, the second conveying system has a length of the passage on which at least one sheet of the sheet-shaped photographic paper E to be exposed by the second exposing system can stay. With this, by constructing the second conveying system 7 so as to have a passage of a length enough to allow at least one sheet of the sheet-shaped photographic paper E to stay on it, at least one sheet of the photographic paper E can be surely stayed and then exposed by the second exposing system 8. Thereafter, the photographic paper E is joined into the first conveying system 6.

The second exposing system 8 is composed of, for example, an exposing section 23 and a lens 24. As the exposing section 23, for example, light emitting elements such as LED can be used. Under the control by the control section 32, the exposing section 23 emits light so as to print images of all frames of the developed photographic film of one order onto the photographic paper E as shown in FIG. 3. An index print can be produced by developing the photographic paper E by the photosensitive material processing apparatus 2.

Namely, firstly, when a photographic film F of a certain order is loaded on a negative film carrier 16, the control section conducts reading an image of each frame successively by a scanner camera 31 while conveying the photographic film F in the arrow direction marked with A. During this reading operation, a photographic paper E to be printed by the second exposing system 8 is formed by cutting a roll-shaped photographic paper P by a cutter section 11, and the sheet-shaped photographic paper E is conveyed to the second conveying system 7.

After the reading operation for the images of all frames of the one order is completed, pre-judgment operation can be conducted by indicating the read images of each six frame from the trailing edge of the photographic film F on a monitor 30. An operator conducts the prejudgment operation such as color correction or density correction if necessary by checking the images on the monitor 30. After the prejudgment is completed, printing is started sequentially from the frame for which the prejudgment is completed. During the printing, the photographic film F is conveyed to the arrow direction marked with B, and the photographic paper P for normal photographic print is simultaneously successively drawn from a magazine 9, cut by a cutter section 11 and conveyed to the first exposing system 4, whereby the printing is conducted.

The exposed normal print is conveyed though the first conveying system 6 to the photosensitive material processing section 2. That is, the exposed normal print is not distributed to the second conveying system 7 so that the exposed normal print is not conveyed though the second conveying system 7 to the photosensitive material processing section 2.

After the prejudgment for all frames of the photographic film F is completed, the control section 32 starts printing for index print onto the photographic paper E which is conveyed to the second conveying system in advance so that the images of all frames of the photographic film are printed on the photographic paper E. This process of forming the index print by the second exposing system 8 is conducted in parallel to the normal print by the first exposing system 4.

After the photographic paper P (P1 in FIG. 3) on which an image of the last frame is printed passes over the joint section 20, the photographic paper E printed by the second exposing system 8 is joined at the joint section to the first conveying system 6, and then the photographic paper E is conveyed to the processing section 51.

With this manner, after the completion of the prejudgment operation for the images of all frames is detected, the printing for the photographic paper E by the second exposing system 8 is started. Further, since the photographic paper E exposed by the second exposing system 8 is conveyed to the processing section 51 after the photographic paper P on which the last image of the photographic film F is printed by the first exposing system 4 as shown in FIG. 3 is conveyed to the processing section 51, as an example, the index print can be obtained at the last of the photographic prints of the one order.

With above manner, since the photographic paper E is distributed from the first conveying system 6 to the second conveying system 7 through the branch section 19, is exposed by the second exposing system 8, and then joined into the first conveying system through the joint section 20, the printing process of the first exposing system 4 is not affected by the printing process of the second exposing system 8. Further, the printing process of the first exposing system 4 can be conducted in parallel to the printing process of the second exposing system 8. Accordingly, the processing capability is increased. The position of the joint section 20 is permissible anywhere if the position is before the photosensitive material processing apparatus 2.

Furthermore, a single set of a supply source may be permissible for both the photographic paper P and the photographic paper E. Two sets of supply sources may be used separately for the first conveying system and the second conveying system. Also, the two set of supply sources may be used for both the photographic paper P and the photographic paper E.

Figure 4:
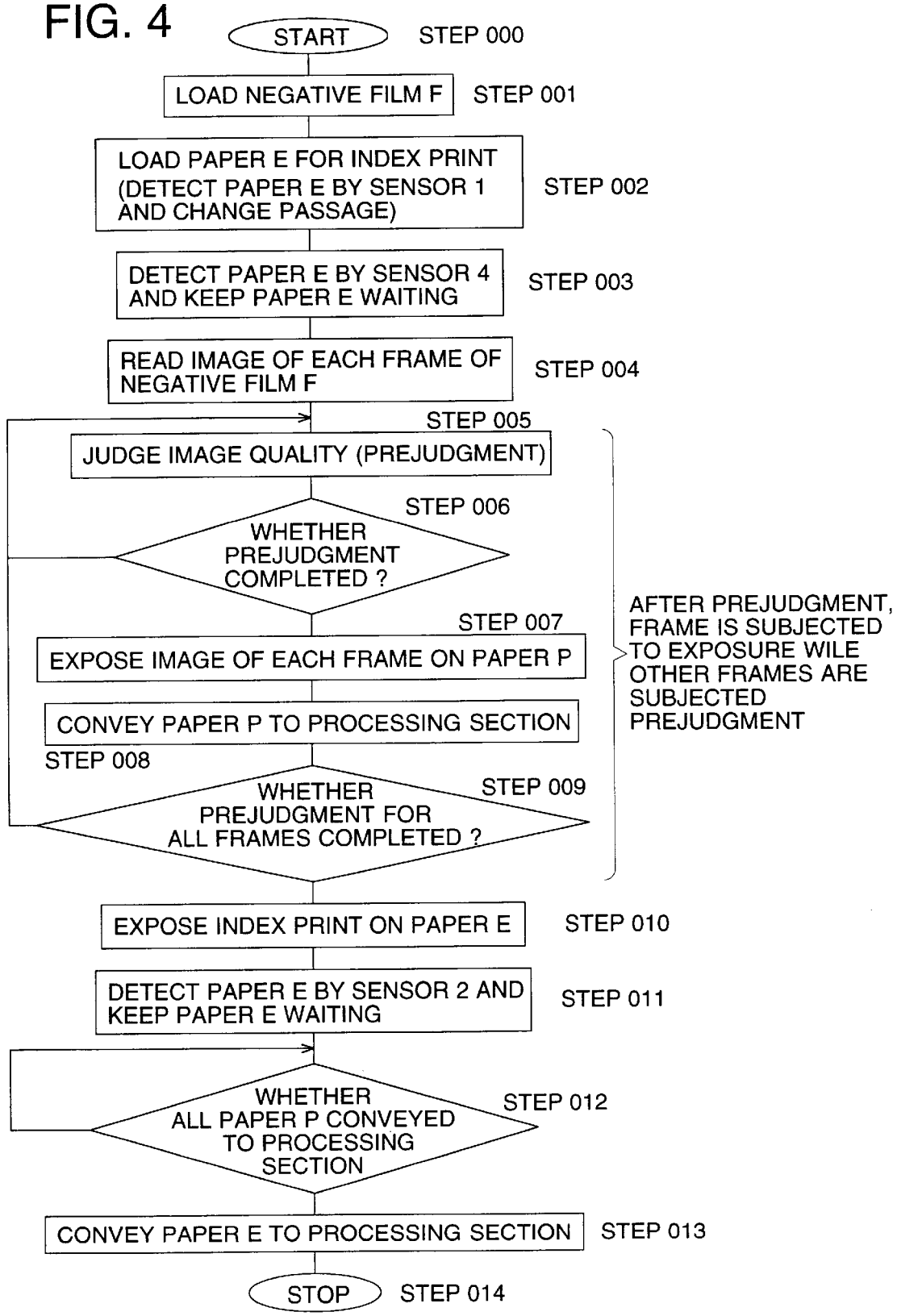
FIG. 4 is a system sequence flowchart showing steps of the second conveying system.
Figure 5:
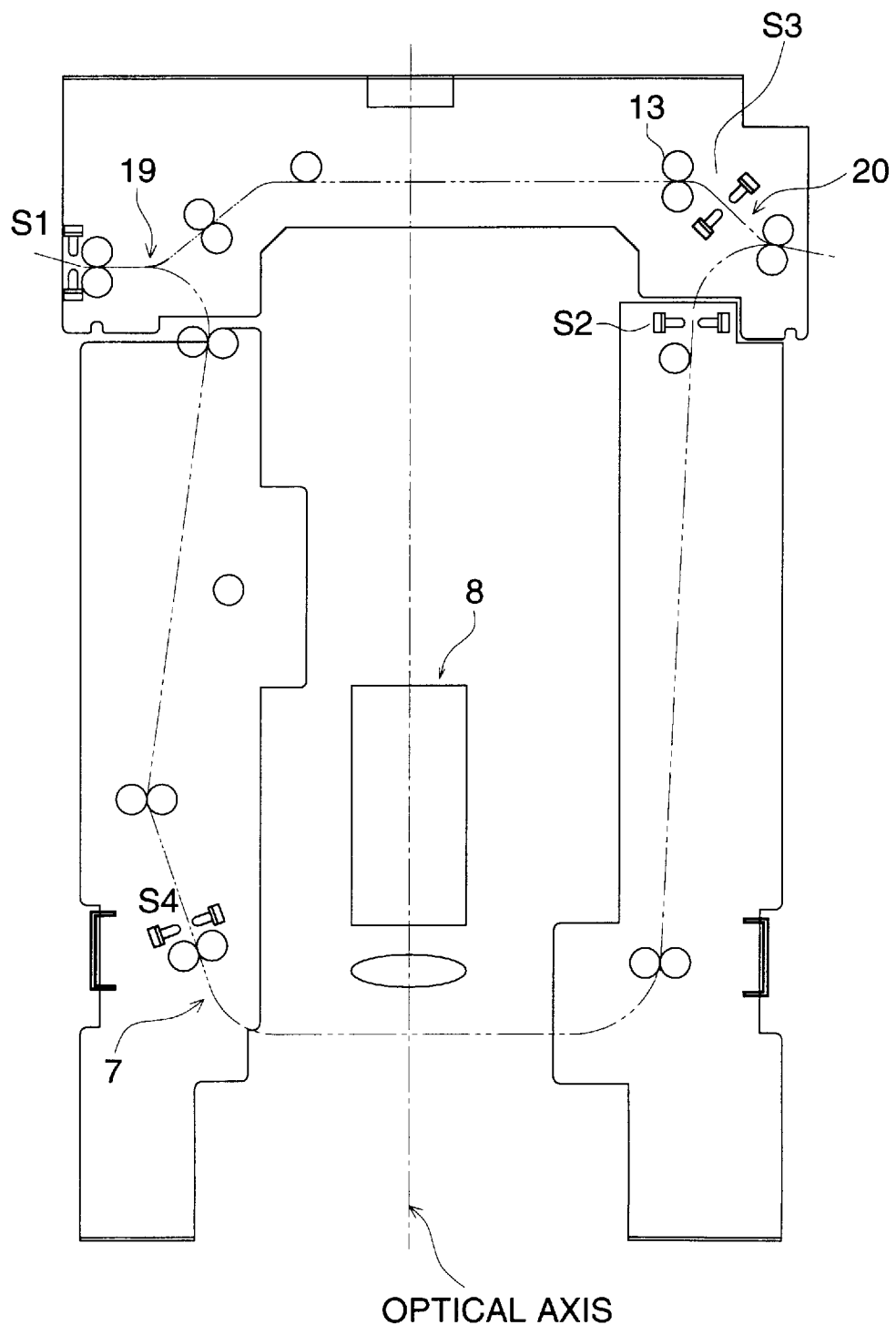
FIG. 5 is a sectional view of the second conveying system showing locations of sensors.

Next, in the exposing apparatus of the present invention, a control necessary for sorting a photographic paper to the first conveying system or the second conveying system and for joining the photographic paper into the first conveying system before the processing section is explained by referring FIGS. 4 and 5.

FIG. 4 is a system sequence flowchart showing steps of 000 to 014 of the second conveying system.

FIG. 5 is a sectional view of the second conveying system showing locations of sensors (paper detecting device).

A sheet-shaped photographic paper E cut in a predetermined size by cutter section 11 is conveyed by the first conveying system 6 and arrives at sensor S1. The sensor S1 is a means for detecting arrival or passage of the sheet-shaped photographic paper P or the sheet-shaped photographic paper E. The control section 32 controls in such a manner that when the sensor S1 detects a photographic paper (in this case, the sheet-shaped photographic paper E) passing the sensor S1 at the first time, the conveying passage is changed to the second conveying system, when the sensor S1 detects a next photographic paper (in this case, the sheet-shaped photographic paper P) passing the sensor S1 at the second time, the conveying passage is changed to the first conveying system, step 002.

Further, it may be permissible to control in such a manner that the sensor S1 detects whether the photographic paper E is cut for index print and sends a predetermined signal to the control section 32. Then, on the basis of the signal from the sensor S1, the control section 32 controls so as to convey the photographic paper E to the second conveying system by a changing means 22 in the case that the photographic paper E is cut for index print.

As a means for detecting whether the photographic paper E is cut for index print, the following may be used. For example, by setting previously such that the first sheet of a photographic paper arriving at the sensor S1 is the photographic paper E for index print, when the sensor S1 detects the first sheet, the sensor S1 sends a predetermined signal indicating that the sheet is the photographic paper E for index print to the control section 32, when the second sheet (that is, the sheet-shaped photographic paper P) arrives at the sensor S1, the sensor S1 sends a predetermined signal indicating that the sheet is not the photographic paper E for index print to the control section 32.

Also, the following may be used as the detecting means. By providing a discrimination member such as a small hole, a mark or a cut-portion on an edge of a photographic paper E when the photographic paper E is cut for index print, whereby S1 judges on the basis of the discrimination member whether the photographic paper E is used for index print.

Further, when a roll-shaped photographic paper is cut out based on size information by the cutter section 11, it may be permissible that the control section 32 judges on the basis of the size information whether the photographic paper E is used for index print.

The photographic paper E conveyed by the changing means 22 to the second conveying system is detected by sensor S4 provided on the second conveying system and then a predetermined signal is sent by the sensor 4 to the control section 32. On the basis of the signal from the sensor S4, the control section 32 stops conveying rollers of the second exposing system so as to keep the photographic paper E waiting at the position of the sensor S4 until the prejudgment for the photographic film F of an order is completed (Step 003).

When the prejudgment for the photographic film F of an order is completed (Step 009), the photographic paper E is conveyed from the waiting position to the second exposing system 8, and then images of all frames of the photographic film F of the order for which the prejudgment is completed are printed on the photographic paper E so as to form an index print. Simultaneously with the operation of the second exposing system, the photographic film F is subjected to the printing process by the first exposing system 4 sequentially from the frame to which the prejudgment is completed so that an image of each frame is sequentially printed on a sheet-shaped photographic paper P, (Step 007). That is, operations from Step 005 to Step 009 are conducted for each frame upon completion of the prejudgment for each frame. The prejudgment can be conducted independently of or in parallel with the printing and the conveying operation.

The sheet-shaped photographic paper P for which the printing is completed is conveyed by the first conveying means and arrives at the sensor S1. The sensor S1 detects whether the photographic paper P is cut for index print and sends a predetermined signal to the control section 32.

When the control section 32 judges on the basis of the detection signal from the sensor S1 that the roll-shaped photographic paper P is not cut for index print, the control section 32 controls so as to convey to the first conveying system by the changing means 22, (Step 008).

The photographic paper E for which the printing of index print is completed is conveyed in the second conveying system. When sensor S2 provided on the second conveying system detects the photographic paper E, the sensor S2 sends a predetermined signal to the control section 32. The control section 32 stops conveying rollers of the second conveying system so as to keep the photographic paper E waiting until the control section 32 receives the signal indicating that the last sheet-shaped photographic paper P passes over sensor S3 provided on the first conveying system, Step 011.

After the last sheet-shaped photographic paper P passes over sensor S3 provided on the first conveying system, Step 012, the control section 32 drives the conveying rollers, then the photographic paper E is conveyed from the waiting position so as to pass the joint section 20 (outlet rollers) and is further conveyed to the processing section 51, (Step 013).

With Item 1, since a photographic paper can be branched off from the first conveying system to the second conveying system, be exposed by the second exposing system, and then jointed with the first conveying system, an exposing and printing process by the first exposing system can be conducted without being affected by an exposing and printing process by the second exposing system, whereby the processing capability is increased.

With Item 2, since the second conveying system is located between the first exposing system and the processing section, a photographic paper exposed by the second exposing system can be conveyed to the processing section rapidly so that the processing time can be shortened.

With Item 3, since the second exposing system prints images of frames of the developed photographic film of an order together, the printing to obtain index print can be conducted by the second exposing system.

With Item 4, at least a single sheet of a photographic paper can surely stay in the second conveying system, the photographic paper is printed by the second exposing system and is jointed into the first conveying system.

With Item 5, by conveying the photographic paper to be printed by the second exposing system in advance, the printing process by the second exposing system can be started without depending on the printing process by the first exposing system.

With Item 6, since the printing is conducted by the second exposing system by detecting the completion of the prejudgment conducted in the time of the printing by the first exposing system and the photographic paper printed by the second exposing system is conveyed to the processing section after the photographic paper on which a final image is printed by the first exposing system is conveyed to the processing section, index print is obtained at the last after normal photographic print.

What is claimed is:

1. A photographic print processing apparatus, comprising:
   (a) a first exposing section to expose an image of a photographic film onto an unexposed photographic paper;
   (b) a development processing section to develop the exposed photographic paper;
   (c) a first conveying passage to convey the exposed photographic paper from the first exposing section to the development processing section;
   (d) a second conveying passage branched from the first conveying passage and joined with the first conveying passage;
   (e) a second exposing section, provided on the second conveying passage, to expose an image onto a photographic paper; and
   (f) a control section to control the first passage and the second passage so as to convey the photographic paper.

2. The photographic print processing apparatus of claim 1, wherein the control section controls so as to convey the photographic paper to the second conveying passage before the first exposing section starts exposing.

3. The photographic print processing apparatus of claim 1, further comprising image judging means for judging the image of the photographic film to be printed by the first exposing section.

4. The photographic print processing apparatus of claim 3, wherein the second exposing section starts exposing after the image judging means completes judging the image of the photographic film of one order.

5. The photographic print processing apparatus of claim 4, wherein the second exposing section exposes all images of the photographic film of the one order.

6. The photographic print processing apparatus of claim 4, wherein the second exposing section exposes all images of the photographic film of the one order on one sheet of a photographic paper.

7. The photographic print processing apparatus of claim 5, wherein the control section controls the second conveying passage so as to convey the photographic paper exposed by the second exposing section to the development processing section after the last photographic paper of the one order exposed by the first exposing section is conveyed to the development processing section.

8. The photographic print processing apparatus of claim 1, wherein the control section controls the second conveying passage so as to convey the photographic paper exposed by the second exposing section to the development processing section after the last photographic paper of the one order exposed by the first exposing section is conveyed to the development processing section.

9. The photographic print processing apparatus of claim 1, further comprising first detecting means for detecting presence or absence of the photographic paper; and distributing means for distributing the photographic paper from the first conveying passage to the second conveying passage, wherein when the first detecting means detects the presence of the photographic paper, the control section controls the distributing means so as to distribute the photographic paper from the first conveying passage to the second conveying passage.

10. The photographic print processing apparatus of claim 1, further comprising a second detecting means for detecting presence or absence of the photographic paper exposed by the second exposing section, and a third detecting means for detecting presence or absence of the photographic paper exposed by the first exposing section, wherein when the second detecting means detects the presence of the photographic paper, the control section stops driving of the second conveying passage from a time that the third detecting means detects the presence of the photographic paper to a time that the third detecting means detects the absence of the photographic paper.

11. The photographic print processing apparatus of claim 9, wherein when the first detecting means detects the photographic paper to be used for exposing all the images of the photographic film of the one order, the first detecting means sends a signal to the control section and the control section controls the distributing means so as to distribute the photographic paper from the first conveying passage to the second conveying passage on the basis of the signal sent from the first detecting means.

12. The photographic print processing apparatus of claim 4, wherein the control section stops conveying the photographic paper to the second exposing section until the judging all the image of the photographic film of the one order is completed.

* * * * *